US008902480B1

(12) United States Patent
Taniguchi

(10) Patent No.: US 8,902,480 B1
(45) Date of Patent: Dec. 2, 2014

(54) IMAGE FORMING APPARATUS, READING APPARATUS AND READING METHOD

(71) Applicants: Kabushiki Kaisha Toshiba, Minato-ku, Tokyo (JP); Toshiba Tec Kabushiki Kaisha, Shinagawa-ku, Tokyo (JP)

(72) Inventor: Shoichi Taniguchi, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/010,896

(22) Filed: Aug. 27, 2013

(51) Int. Cl.
| | |
|---|---|
| *H04N 1/04* | (2006.01) |
| *H04N 1/00* | (2006.01) |
| *G06T 5/00* | (2006.01) |
| *G06K 9/00* | (2006.01) |
| *G06K 9/40* | (2006.01) |
| *G06K 15/02* | (2006.01) |

(52) U.S. Cl.
CPC ...................................... *G06K 15/02* (2013.01)
USPC ........... 358/474; 358/498; 358/400; 358/475; 358/3.26; 382/165; 382/274

(58) Field of Classification Search
USPC ......... 358/474, 498, 400, 475, 3.26; 382/165, 382/274
See application file for complete search history.

(56) References Cited

U.S. PATENT DOCUMENTS

| | | | | | |
|---|---|---|---|---|---|
| 5,825,513 | A | * | 10/1998 | Hasegawa | ...................... 358/498 |
| 8,036,487 | B2 | * | 10/2011 | Nishijima | ...................... 382/274 |
| 8,081,355 | B2 | * | 12/2011 | Nishina et al. | ................ 358/474 |
| 2010/0215260 | A1 | * | 8/2010 | Niikura | ......................... 382/165 |

FOREIGN PATENT DOCUMENTS

JP          2004-260297          9/2004

* cited by examiner

*Primary Examiner* — Charlotte M Baker
*Assistant Examiner* — Rury Grisham
(74) *Attorney, Agent, or Firm* — Amin, Turocy & Watson, LLP

(57) ABSTRACT

An image forming apparatus comprises an image sensor configured to extend in a horizontal scanning direction, a carriage, a guide section and a reading control section. The carriage configured to move in a vertical scanning direction orthogonal to the horizontal scanning direction to change a reading position of a document. The guide section configured to have a guide surface for guiding the document to the document glass, and a white part, a first colorizing part and a second colorizing part which are formed on the guide surface in line in the vertical scanning direction. The reading control section configured to move the carriage to align the reading position in the vertical scanning direction with one of the white part, the first colorizing part and the second colorizing part and execute a reading processing.

10 Claims, 8 Drawing Sheets

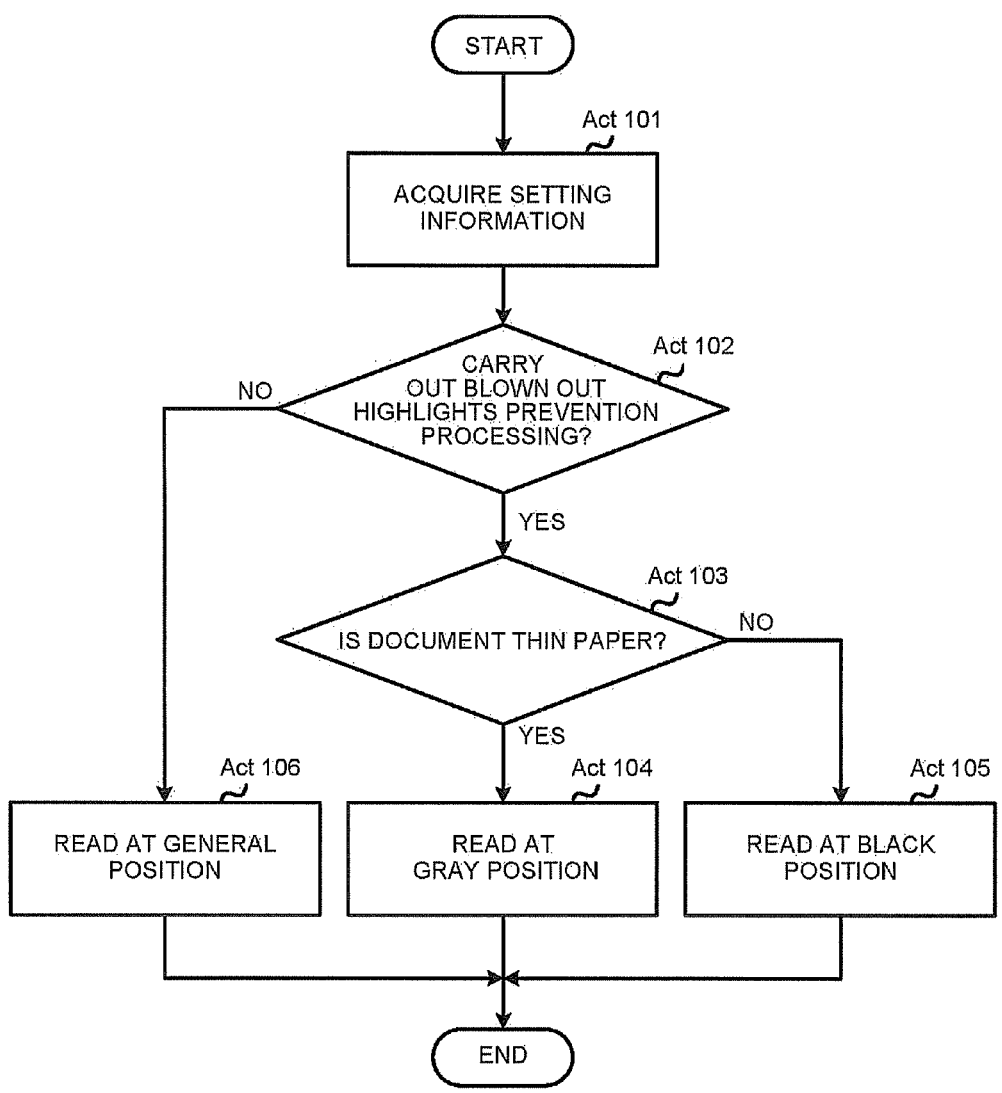

IMAGE FORMING APPARATUS, READING APPARATUS AND READING METHOD

FIELD

Embodiments described herein relate to a technology for conveying and reading a paper using the automatic document feeder of an image forming apparatus or a reading apparatus.

BACKGROUND

Conventionally, an image forming apparatus comprises an automatic document feeder (ADF) for reading a document during a copying or scanning. When conveyed and read by the ADF, the document arranged on the ADF passes along the document glass for the ADF. Then, the passed along document is read by a reading unit consisting of an exposure lamp, a mirror or an image sensor. With an image forming apparatus or a reading apparatus provided with an ADF, pieces of documents can be conveyed to a reading position and successively read piece by piece.

However, the image of the document sometimes undergoes blown out highlights if the document is conveyed and read by the ADF. Especially for thin lines or a part light (pale) in color, it will cause blown out highlight easily. Thus, the reproducibility of the image on a document generated by the reading processing using the ADF is sometimes reduced, depending on the content of the image.

DESCRIPTION OF THE DRAWINGS

FIG. 8 is a flowchart illustrating the flow of a reading processing.

DETAILED DESCRIPTION

In accordance with an embodiment, an image forming apparatus comprises an ADF for conveying a document subject to the reading to a reading position on a document glass, an image sensor extending in a horizontal scanning direction, a carriage, a guide section and a reading control section. The carriage moves in a vertical scanning direction orthogonal to the horizontal scanning direction to change a reading position of a document. The guide section has a guide surface for guiding a document to the document glass, and a white part extending in the horizontal scanning direction, a first colorizing part having a color lower in brightness than the white part and extending in the horizontal scanning direction and a second colorizing part having a color lower in brightness than the first colorizing part and extending in the horizontal scanning direction which are formed on the guide surface in line in the vertical scanning direction. The reading control section moves the carriage to align the reading position in the vertical scanning direction with one of the white part, the first colorizing part and the second colorizing part and then executes a reading processing.

Figure 1:
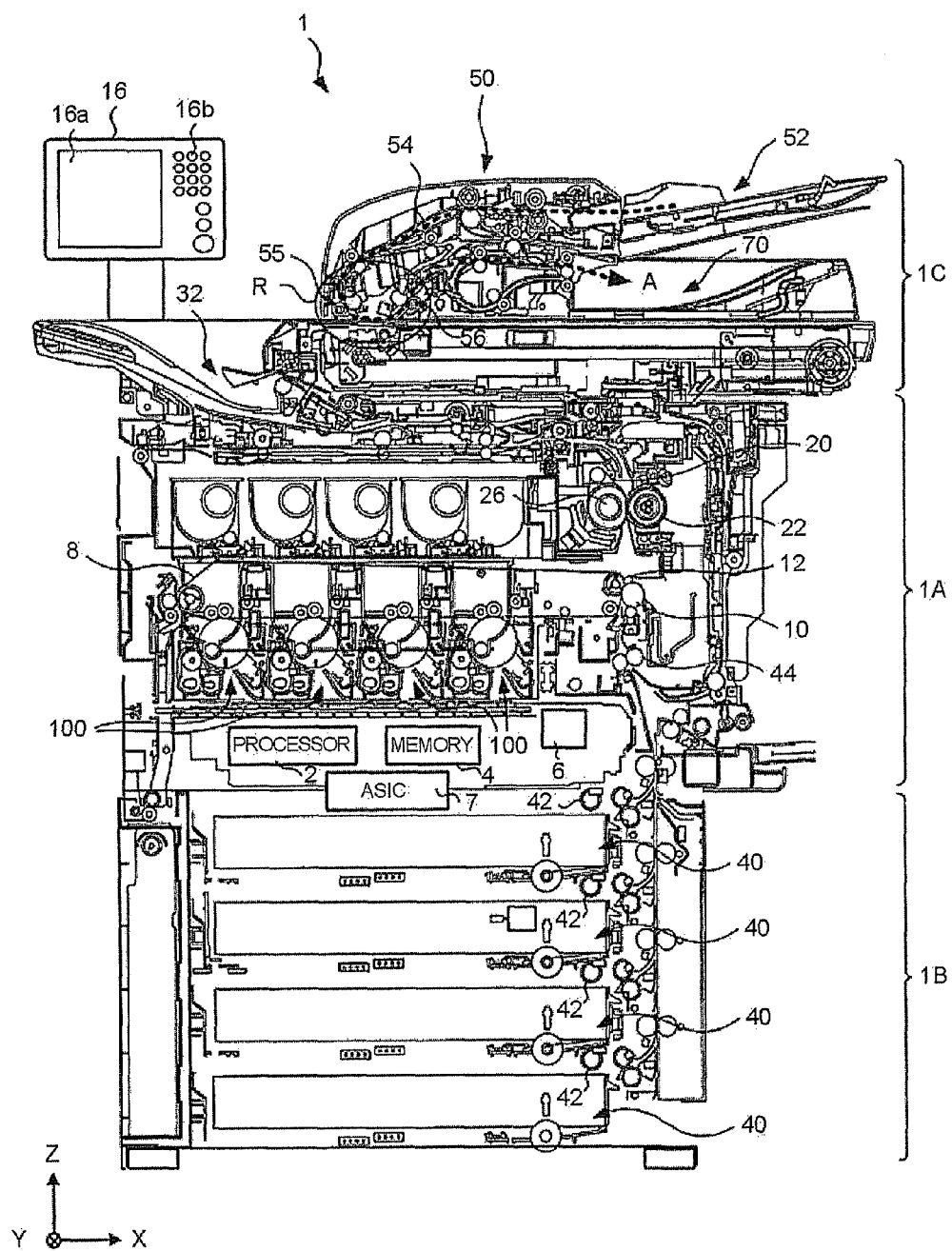
FIG. 1 is a longitudinal section view illustrating the schematic configuration of an image forming apparatus according to an embodiment.
Figure 2:
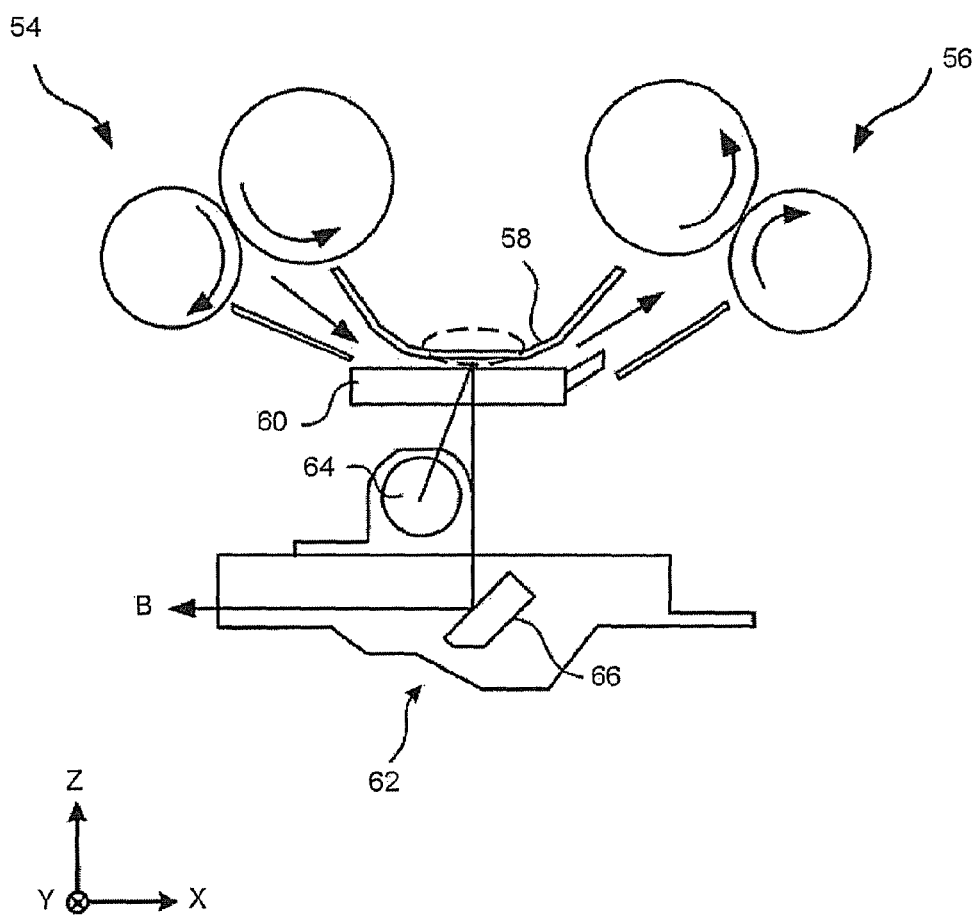
FIG. 2 is a magnified view of a part reading a document using the ADF of an image forming apparatus according to an embodiment.

The image forming apparatus according to the embodiment is described below. FIG. 1 is a longitudinal section view illustrating the schematic configuration of an image forming apparatus 1 according to the embodiment. FIG. 2 is a magnified view of a part R reading a document using the ADF 50 of the image forming apparatus 1. As an example, the image forming apparatus described in the embodiment is an MFP (Multi Function Peripheral) having a plurality of functions, such as print function, a copy function or scan function of scanning and printing a document.

The image forming apparatus 1 comprises: a processor 2, a memory 4, an auxiliary storage device 6, an operation panel 16, an image forming section 1A, a sheet supplying section 1B and an image reading section 10.

The processor 2, which is a controller for controlling various processing in the image forming section 1A, the sheet supplying section 1B and the image reading section 10, etc, realizes various functions and executes processing by executing the program stored in the memory 4 or the auxiliary storage device 6.

The processor 2 is a CPU (Central Processing Unit) or an MPU (Micro Processing Unit) capable of executing the same arithmetic processing like a CPU. Further, part of or whole functions of the image forming apparatus 1 realized by the processor 2 may be realized by an ASIC (Application Specific Integrated Circuit) 7 serving as a processor.

The memory 4, that is, the called main storage device, stores programs for the processor 2 to realize the image forming processing of the image forming section 1A, the sheet supplying processing of the sheet supplying section 1B and the image reading processing of the image reading section 10 and the like. Further, the memory 4 provides a temporary working area for the processor 2. The memory 4 may be, for example, a RAM (Random Access Memory), a ROM (Read Only Memory), a DRAM (Dynamic Random Access Memory), a SRAM (Static Random Access Memory), a VRAM (Video RAM) and a flash memory.

The auxiliary storage device 6 stores various information in the image forming apparatus 1 and is capable of storing the image data, for example, generated by reading a document with the image reading section 1C. The auxiliary storage device 6, for example, may be a magnetic storage device such as a hard disc drive, an optical storage device, a semiconductor Storage device (e.g. flash memory and the like), or any combination thereof.

The operation panel 16 is an operation input unit for the image forming apparatus 1 as well as a display section for carrying out the screen display such as a setting screen. The operation panel has a touch display 16a and operation keys 16b. An operation input is carried out while the touch display 16a carries out a screen display. The operation keys 16b are physical buttons for carrying out various operation input.

The image forming section 1A carries out a processing forming an image on a sheet during a print or copy processing. The image forming section 1A forms an image on a sheet such as a piece of paper supplied from the sheet supplying section 1B based on a print or copy job.

The image forming section 1A comprises: four process units 100 corresponding to colors of yellow, magenta, cyan and black, an intermediate transfer belt 8 serving as an image carrier, a secondary transfer roller 10 serving as a transfer component, a secondary transfer opposing roller 12 and an discharging tray 32. Further, the image forming section 1A serving as a fixing apparatus comprises a fixing belt 20, a fixing roller 26 and a pressurization roller 22.

The sheet supplying section 1B, which supplies a sheet to the image forming section 1A, comprises: a paper feed cassette 40, a pickup roller 42 and a conveyance roller 44. Further, the image forming apparatus shown in FIG. 1 comprises four paper feed cassettes 40 and four pickup rollers 42.

The image reading section 1C is an image reading apparatus which is provided with a copier or an image scanner to read an image of a document when carrying out copying or scanning the document. The image reading section 1C consists of the ADF 50 and a scanner section.

The ADF 50 of the image reading section 1C is an apparatus which continuously conveys documents, piece by piece, to a reading position so that the documents can be successively scanned. Further, the ADF 50 can make a document to be duplex scanned if provided with a conveyance path for scanning duplex of a document, by make a document pass along the duplex scanning conveyance path, and if needed, by carrying out switchback conveying. According to the embodiment, the ADF 50 comprises: a document platform 52, a conveyance path 54, a pre-reading roller pair 55, a post-reading roller pair 56, a platen guide 58 serving as a guide section and a discharging tray 70.

Further, the scanner section reads the document conveyed by the ADF 50. The scanner section consists of a CCD sensor serving as an image sensor, a carriage 62, a document glass 60 for the ADF and a carriage driving mechanism for moving the carriage 62. Further, when the cover carried on the ADF 50 is opened to place a document on the document glass, the scanner section enables the carriage 62 to scan in the vertical scanning direction and read the document on the document glass.

The document platform 52 is a platform on which the document read by the ADF 50 is placed. The document placed on the document platform 52 is picked up by the pickup roller and conveyed to a reading position along the conveyance path 54.

The pre-reading roller pair 55 is a conveyance roller pair positioned at the upstream side of the conveyance direction of the document with respect to the reading position of the document. The post-reading roller pair 56 is a conveyance roller pair positioned at the downstream side of the conveyance direction of the document with respect to the reading position. The platen guide 58 serving as a guide section is a component for guiding the document conveyed to the reading position to the glass surface of the document glass 60 for the ADF. As the document is guided by the platen guide 58 to the document glass 60 for the ADF where the document is in close contact with and passes along the glass surface, the document can be exactly read by the scanner section. The platen guide 58 is a curved surface curved with respect to the document glass 60 for the ADF in the cross-section surface (the cross-section surface in the X-Z plane) shown in FIG. 1 and FIG. 2. The platen guide 58, which is a bent metal plate component in the embodiment, can be any component of any shape and structure made from any material as long as the component has a guide surface for guiding the document to the document glass 60 for the ADF such that the document is in close contact with the document glass 60. The platen guide 58 in the embodiment will be described later in detail.

Sequentially, the carriage 62 carries an optical system for reading the document which is conveyed by the ADF 50 and passes along the document glass 60 for the ADF. The reading position can be changed by moving the carriage 62. In the embodiment, as indicated by the arrow B shown in FIG. 2, after shining the document at the reading position, the light from the exposure lamp 64 of the carriage is reflected and guided to the CCD sensor by a plurality of mirrors such as a mirror 66 so as to read the document. The position where a document is shined by the light guided to the CCD sensor is the reading position of the document according to the ADF 50.

The carriage 62 is guided by, for example, a guide rail, to scan along the rail in the X-axial direction under the drive of the carriage driving mechanism. The CCD sensor extends in the horizontal scanning direction (the Y-axial direction shown in FIG. 1), and the carriage 62 is capable of moving in the vertical scanning direction orthogonal to the horizontal scanning direction. Thus, the reading position based on the carriage 62 may be any position in the vertical scanning direction. In the embodiment, when the document is read by the ADF 50, the carriage 62 is moved at a position opposite to the document glass 50 for the ADF so as to read the document passed along the glass surface.

The carriage 62 may further comprise a reflecting plate (reflector) for efficiently emitting the light of the exposure lamp 64 to the document surface. The carriage driving mechanism comprises a carriage wire for transferring a motor or the rotation of a motor to the carriage.

Figure 3:
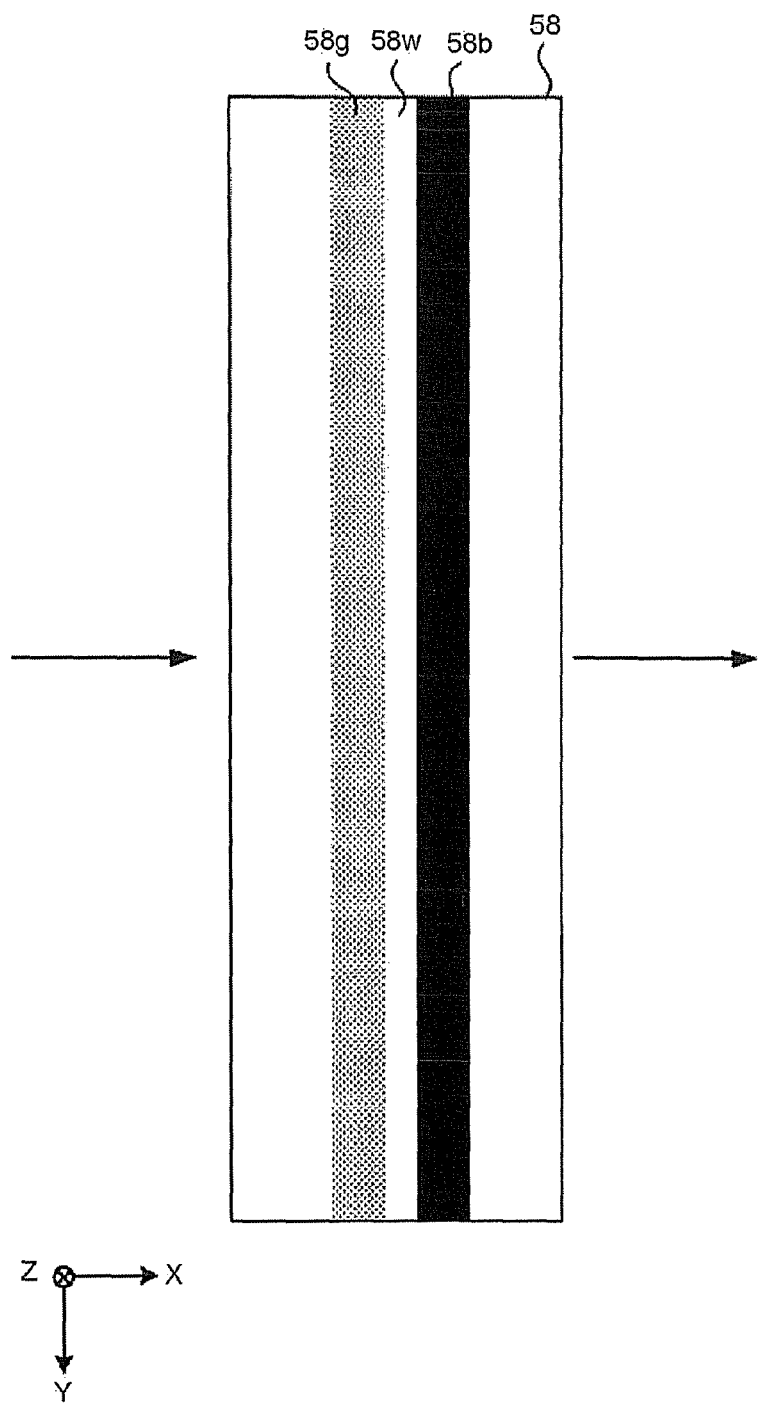
FIG. 3 is a diagram illustrating a platen guide serving as a presser member observed from the side of the document glass of an ADF (observed from the Z-axial direction)

Next, the platen guide 58 serving as a guide section is described below in detail. In the embodiment, the guide surface of the platen guide 58 opposite to the document glass 60 for the ADF is colored with different colors according to the position of the conveyance direction of the document. FIG. 3 is a diagram illustrating the platen guide 58 observed from the document glass 60 for the ADF (observed from the Z-axial direction).

As shown in FIG. 3, the platen guide 58 described in the embodiment comprises a white part 58w, a first colorizing part serving as a gray part 58g which is lower in brightness than (darker than) the white part, and a second colorizing part serving as a black part 58b which is lower in brightness than the second colorizing part. The white part 58w, the gray part 58g and the black part 58b form a strip shape along the Y-axial direction (the horizontal scanning direction) serving as the longitudinal direction of the platen guide 58. Moreover, the white part 58w, the gray part 58g and the black part 58b are formed in order in the X-axial direction (the vertical scanning direction). In the embodiment, as shown in FIG. 3 and the like, the white part 58w is located in the center while the gray part 58g is positioned at the upstream side of the document conveyance direction of the white part 58w and the black part 58b at the downstream side of the white part 58w. No specific limitation is given to the order of the white part 58w, the gray part 58g and the black part 58b, and as shown in FIG. 3, it is preferred that the white part 58w is located in the center while one of the gray part 58g and the black part 58b is formed at the upstream side of the white part 58w and the other one at the downstream side of the white part 58w. The reason for this arrangement is to shorten the moving distance from the general reading position of the carriage 62, that is, the position of the white part 58w, to each colorizing part.

In this way, there is a part in a color lower in brightness than white on the guide surface of the platen guide 58 opposite to the document glass 60 for the ADF such that the color of the back side of the document read by the carriage 62 can be changed to a color lower in brightness than white. Specifically, by moving the carriage 62 to change the reading position in the vertical scanning direction, the color of the platen guide 58 at the reading position may be any one of white, gray and black.

Figure 4:
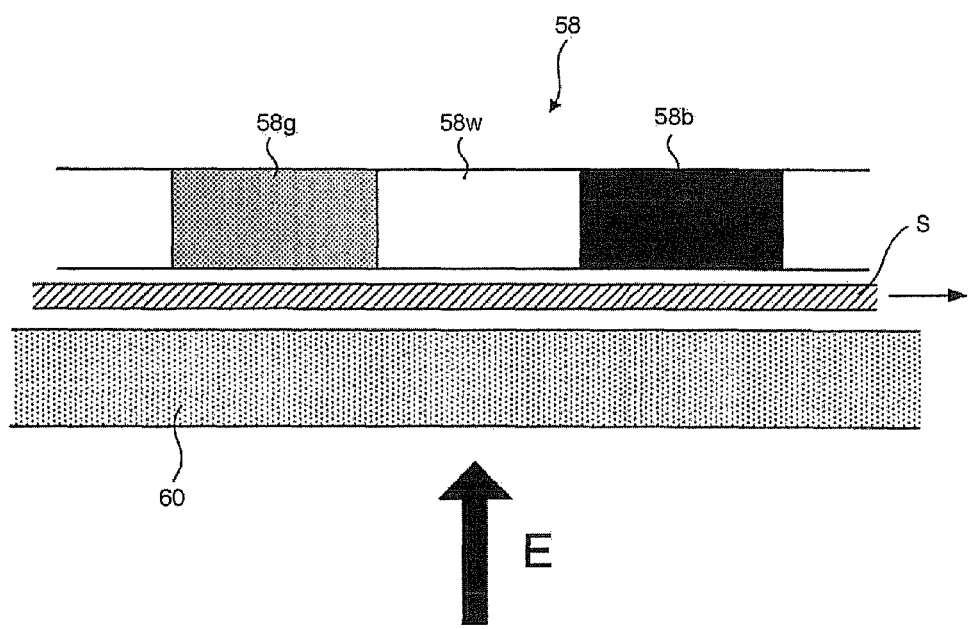
FIG. 4 is a diagram schematically illustrating the relationship between a platen guide and a reading position.
Figure 5:
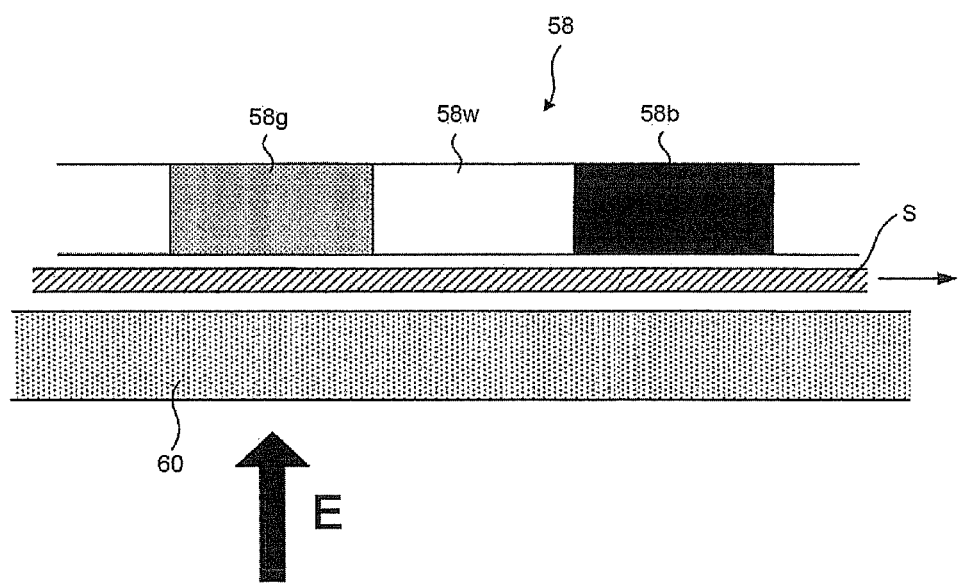
FIG. 5 is a diagram schematically illustrating the relationship between a platen guide and a reading position when the reading position changed.
Figure 6:
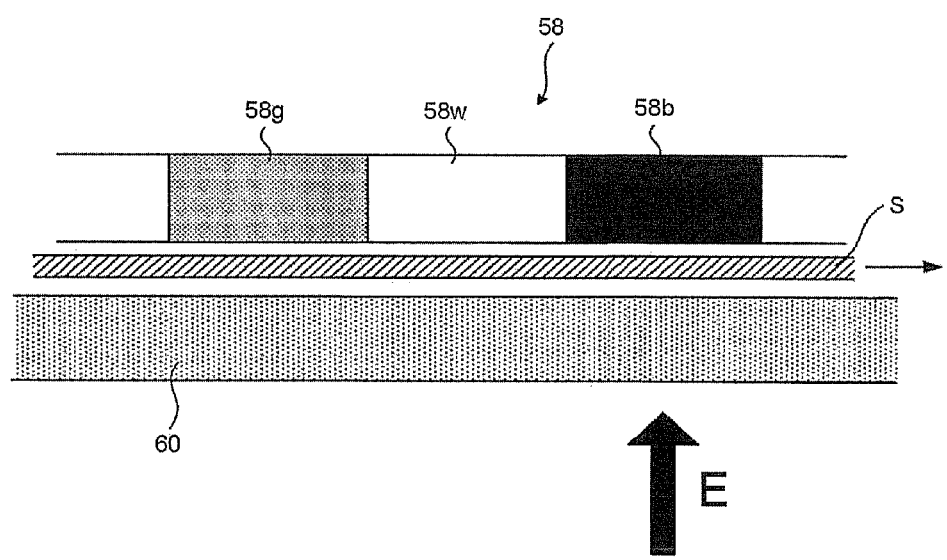
FIG. 6 is a diagram schematically illustrating the relationship between a platen guide and a reading position when the reading position changed.

FIG. 4-FIG. 6 are diagrams schematically illustrating the relationship between the platen guide 58 and reading positions when reading positions changed. First, as shown in FIG. 4, when the reading position E is the position of the white part 58w of the platen guide 58, the color of the platen guide 58 behind the document at the reading position becomes white. Further, as shown in FIG. 5, when the reading position E is changed to the position of the gray part 58g by moving the carriage 62, the color of the platen guide 58 behind the document changes to gray. Further, as shown in FIG. 6, when the reading position E is changed to the position of the black part 58b by moving the carriage 62, the color of the platen guide 58 behind the document changes to black.

Thus, in the embodiment, by moving the carriage and changing the reading position, the color of the back side of the document can be changed to other colors lower in brightness than white in addition to ordinary white. When the color of the platen guide 58 at the reading position E is lower in brightness than white, light reflection from the exposure lamp 64 of the platen guide 58 is weaker than that is white color. In this way, the reflection from the platen guide 58 can be weakened when the light is easily transmitted such as the paper of the document is thin. Weakening the reflection from the platen guide can protect an image against blown out highlights. Especially, when the image of the document contains thin lines or an image colored in a light-color, strong light reflection from the platen guide 58 is likely to cause blown out highlights, which may lower the reproducibility of the copied or scanned image.

Therefore, to prevent the blown out highlights of an image, the carriage 62 can be moved to change the reading position E to the position of the gray part 58g or the black part 58b lower in brightness than white to carry out reading. Further, when the light is easily transmitted such as a sheet is thin, if the platen guide 58 is the black, part 58b, then the copied image is likely to become black (black fuzziness is generated), thus, it is preferred that take the position of the gray part 58g as the reading position. In this way, the generation of a black fuzziness is prevented and a high-quality image can be obtained from a copy or scan processing while the reproducibility of a part likely to undergo blown out highlights, such as a thin line, is guaranteed. Set the reading position E to the black part 58b, when reading a document not likely to generate fuzziness—such as a thick document.

Widths in document conveyance directions of the white part 58w, the gray part 58g and the black part 58b, which are not limited specifically, are within a range of 2 mm-3 mm.

Further, it is preferred that the white part 58w, the gray part 58g and the black part 58b are formed in an area on the guide surface of the platen guide 58 where the document can be guided closely contacting the document glass 60 for the ADF. If the gray part 58g, etc is formed at the position where the document floats on the glass surface and then take the position as a reading position, then it may occur that the document may be not read accurately.

Figure 7:
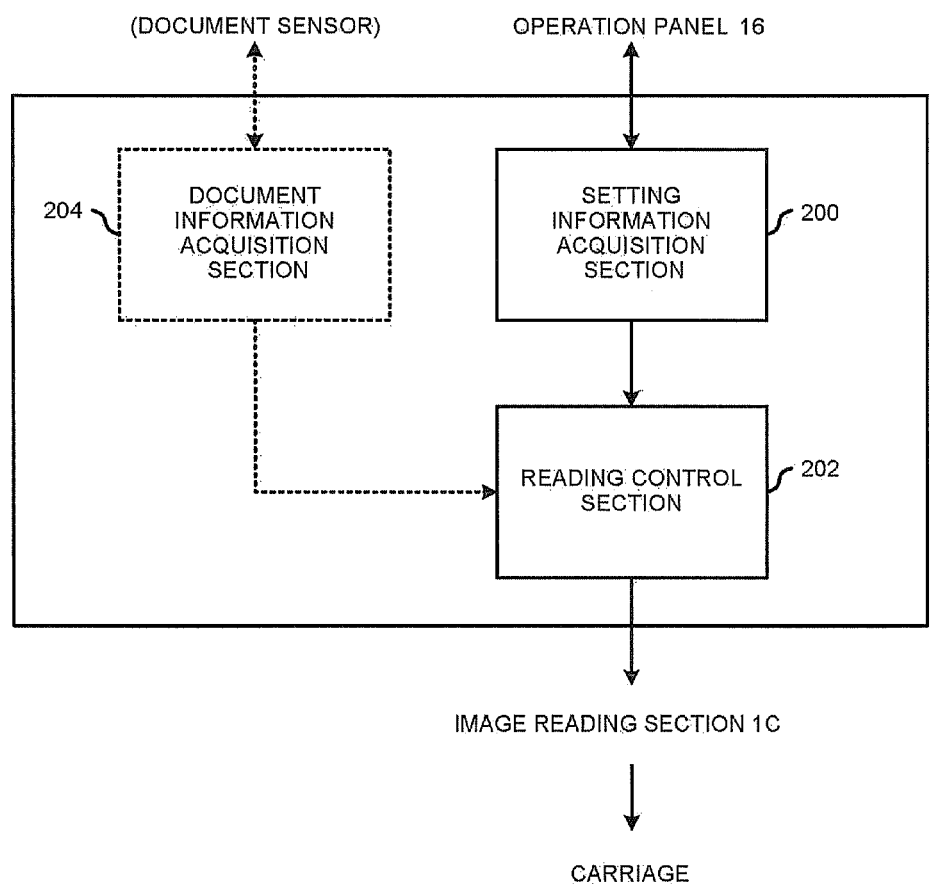
FIG. 7 is a functional block diagram illustrating for realizing the processing function of an image forming apparatus according to an embodiment.

Below is description on a processing of aligning the reading position with any position of the white part 58w, the gray part 58g and the black part 58b to carry out the reading of a document by the ADF 50 in the image forming apparatus 1 according to the embodiment. First, the functions for achieving the processing are described. FIG. 7 is a functional block diagram illustrating functions of the image forming apparatus 1 according to the embodiment.

The image forming apparatus 1 comprises a setting information acquisition section 200 and a reading control section 202. The functional blocks are achieved by the processor 2 executing the reading processing program stored in the memory 4 or the auxiliary storage device 6. Further, part of or whole functions can be achieved by the ASIC 7.

If an input setting a condition when reading a document with the image reading section 1c on the operation panel is input, the setting information acquisition section 200 acquires the setting information. In the embodiment, the setting information acquisition section 200 acquires the setting information on the reading position of the carriage 62 when reading the document conveyed by the ADF 50. Specifically, the setting information acquisition section 200 acquires an input setting the reading position of a document to be the gray part 58g or the black part 58b when wanting to prevent blown out highlights. Actually, for example, when a mode preventing the blown out highlights (e.g., 'the blown out highlights prevention mode') is set capable of being selected and displayed on a screen, and then the blown out highlights prevention mode is selected, the setting information acquisition section 200 acquires selection information indicating that the blown out highlights prevention mode is selected.

Further, when the blown out highlights prevention mode is selected, information on the designation of either of the gray part 58g and the black part 58b can be acquired. For example, a set screen concerning the thickness of a document such as a basis weight of a document subject to the reading is displayed on the operation panel 16. Then, the setting information acquisition section 200 acquires the input information concerning the thickness of the document. At this time, if it is input that the paper of a document is a thin paper, then the reading position is set to be the gray part 58g; otherwise, the reading position is set to be the black part 58b. Further, a screen directly designating either of the gray part 58g and the black part 58b is displayed on the operation panel 16, then the setting information acquisition section 200 acquires information designating the either one.

The reading control section 202 controls the document reading processing of the image reading section 10 based on the setting information acquired by the setting information acquisition section 200. In the embodiment, if an input of preventing blown out highlights is input by the user during the reading process with the ADF 50, then the reading control section 200 carries out a reading processing after the document reading position is changed from the position of the general white part 58w to the position of the gray part 58g or the black part 58b lower in brightness than the white part. As stated above, if it is designated that the paper of the document is thin, then the reading control section 202 can move the carriage 62 to set the reading position to be the position of the gray part 58g. In other cases (or if it is designated that it is thick paper), the reading control section 202 sets the reading position to be the position of the black part 58b. In this way, in the embodiment, when blown out highlights is prevented on an image to be copied or to be scanned, and a document having a first thickness, the reading position of which is set to be the position of the gray part 58g, and a document having a second thickness thicker than a first thickness, the reading position of which is set to be the position of the black part 58b, thereby, the reading processing is carried out.

Above is description of functional blocks for realizing a reading processing based on the ADF 50 of the image forming apparatus 1 according to the embodiment. Further, as shown in FIG. 7, the image forming apparatus 1 may further comprise a document information acquisition section 204 configured to acquire information concerning the thickness of a document from a document sensor for detecting the thickness of the document. For example, when the document sensor detects that the thickness of a document is thinner than a given thickness, the document information acquisition section 204 acquires information representing the subject from the document sensor. Then, the reading control section 202 moves the carriage 62 based on the information acquired by the document information acquisition section 204 to carry out a reading processing. Further, when it is detected that the thickness of a document is thicker than a given thickness, the reading control section 202 moves the carriage 62 to the position of the black part 58b to carry out a reading processing. The document sensor may be a sensor which directly detects the thickness of a paper, or a sensor measuring a basis weight of papers, or a sensor detecting the light transmission properties.

Next, the flow of the reading processing of the ADF 50 of the image forming apparatus 1 of the embodiment is described below. FIG. 8 is a flowchart illustrating the flow of the reading processing.

First, the setting information acquisition section 200 acquires setting information designating a condition for a reading processing from the operation panel (Act 101). Specifically, the setting information acquisition section 200 acquires setting information on whether or not a blown out highlights prevention mode is designated and on the designating of the position of either the gray part 58g or the black part 58b where a reading is carried out when the blown out highlights prevention mode is designated. The designating information of a reading position is, for example, the aforementioned information designating that the document is a piece of thin paper.

Next, the reading control section 202 determines whether or not to carry out a processing of preventing blown out highlights based on the setting information acquired by the setting information acquisition section 200 (Act 102).

If the mode preventing the blown out highlights is designated (Yes in Act 102), the reading control section 202 determines whether or not the document is a piece of thin paper based on the setting information (Act 103).

If it is determined that the document is a piece of thin paper (Yes in ACT 103), the reading control section 202 moves the carriage 62 to align the reading position with the position of the gray part 58g and then carries out a reading processing (Act 104). If it is determined that the document is not a piece of thin paper (No in ACT 103), the reading control section 202 moves the carriage to align the reading position with the position of the black part 58b and then carries out a reading processing (Act 105).

On the other hand, if it is determined in Act 102 that no blown out highlights prevention processing is selected (No in Act 102), the reading control section 202 sets the reading position to be the position of the white part 58w and then executes a general reading processing (Act 106).

Above is the flow of the reading processing of the image forming apparatus 1 described in the embodiment. Further, as illustrated in the description of the functional blocks shown in FIG. 4, the thickness may be detected by a sensor and the like but not input by a user, and whether or not to carry out a reading processing in a mode preventing the blown out highlights is determined based on the result of the detection. In this case, the setting information acquisition processing described in Act 101 is replaced by which the document information acquisition section 204 acquires information concerning the thickness of a document from a document sensor. Then, the reading control section 202 determines whether or not to execute a blown out highlight prevention processing based on the information concerning the thickness of a document, and set the reading position to be which one of either positions of the gray part 58g and the black part 58b when carry out the blown out highlights prevention processing and then carries out a reading processing.

Further, in the embodiment, a structure in which the carriage 62 is provided with the exposure lamp and the mirror 68 and reflected light is guided to a CCD sensor serving as an image sensor with other mirrors is described as a structure of an optical system relating to the document reading of the image reading section 1C, however, the present invention is not limited to this case. For example, the structure may further be an integrated optical system carrying an image sensor on the carriage 62. The reading processing described in the embodiment can be applied as long as the image reading section 1C is provided with a carriage capable of moving in the vertical scanning direction and changing the reading position.

In the embodiment, the case which the functions for implementing the present invention are prerecorded in the apparatus is described, however, the present invention is not limited to this case, the same functions may also be downloaded to the apparatus from a network or stored in a recording medium and then installed in the apparatus. The recording medium may be any form, so long as it is a recording medium which can store the program, and furthermore, is apparatus-readable, like a CD-ROM and the like. In addition, functions acquired by the installation or the downloading in advance can be also realized by synergistically acting with the OS (operating system) and the like inside the apparatus.

As stated in detail above, according to the technology described herein, an image forming apparatus can be provided which is possible to carry out copy processing or reading processing with a high reproducibility reproducing the image of a document more accurately even if a document subject to the reading contains thin lines or an image light in color.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming apparatus provided with an automatic document feeder for conveying a document subject to the reading position on a document glass, comprising:
   an image sensor configured to extend in a horizontal scanning direction;
   a carriage configured to move in a vertical scanning direction orthogonal to the horizontal scanning direction to change a reading position of a document;
   a guide section configured to have a guide surface for guiding the document to the document glass, and a white part extending in the horizontal scanning direction, a first colorizing part having a color lower in brightness than the white part and extending in the horizontal scanning direction and a second colorizing part having a color lower in brightness than the first colorizing part and extending in the horizontal scanning direction which are formed on the guide surface in line in the vertical scanning direction; and a reading control section configured to move the carriage to align the reading position in the vertical scanning direction with one of the white part, the first colorizing part and the second colorizing part and execute a reading processing.

2. The image forming apparatus according to claim 1, wherein
the reading control section configured to acquire information concerning the thickness of a document and based on the acquired information sets the reading position to be the position of the first colorizing part when the document has a first thickness or to be the position of the second colorizing part when the document has a second thickness thicker than the first thickness.

3. The image forming apparatus according to claim 1, wherein
the color of the first colorizing part is gray and that of the second colorizing part is black.

4. The image forming apparatus according to claim 1, wherein
the white part is formed between the first colorizing part and the second colorizing part on the guide surface of the guide section.

5. A reading apparatus provided with an automatic document feeder for conveying a document subject to the reading to the reading position on a document glass, comprising:
an image sensor configured to extend in a horizontal scanning direction;
a carriage configured to move in a vertical scanning direction orthogonal to the horizontal scanning direction to change a reading position of a document;
a guide section configured to have a guide surface for guiding the document to the document glass, and a white part extending in the horizontal scanning direction, a first colorizing part having a color lower in brightness than the white part and extending in the horizontal scanning direction and a second colorizing part having a color lower in brightness than the first colorizing part and extending in the horizontal scanning direction which are formed on the guide surface in line in the vertical scanning direction; and
a reading control section configured to move the carriage to align the reading position in the vertical scanning direction with one of the white part, the first colorizing part and the second colorizing part and carry out a reading processing.

6. The reading apparatus according to claim 5, wherein
the reading control section acquires information concerning the thickness of a document and based on the acquired information sets the reading position to be the position of the first colorizing part when the document has a first thickness or to be the position of the second colorizing part when the document has a second thickness thicker than the first thickness.

7. The reading apparatus according to claim 5, wherein
the color of the first colorizing part is gray and that of the second colorizing part is black.

8. A reading method for an image forming apparatus provided with an automatic document feeder for conveying a document subject to the reading position on a document glass, an image sensor extending in a horizontal scanning direction, a carriage moving in a vertical scanning direction orthogonal to the horizontal scanning direction to change a reading position of a document and a guide section having a guide surface for guiding the document to the document glass, and a white part extending in the horizontal scanning direction, a first colorizing part having a color lower in brightness than the white part and extending in the horizontal scanning direction and a second colorizing part having a color lower in brightness than the first colorizing part and extending in the horizontal scanning direction which are formed on the guide surface in line in the vertical scanning direction, comprising:
moving the carriage to align the reading position in the vertical scanning direction with one of the white part, the first colorizing part and the second colorizing part; and
executing a reading processing at the set reading position.

9. The reading method according to claim 8, wherein
acquiring information concerning the thickness of a document;
setting the reading position to be the position of the first colorizing part based on the acquired information if the document has a first thickness; and
setting the reading position to be the position of the second colorizing part if the document has a second thickness thicker than the first thickness.

10. The reading method according to claim 8, wherein
the color of the first colorizing part is gray and that of the second colorizing part is black.

* * * * *